United States Patent
Truong et al.

(10) Patent No.: US 10,966,588 B2
(45) Date of Patent: Apr. 6, 2021

(54) ANTIMICROBIAL HYDROPHILIC POLYURETHANE FOAM SPONGES

(71) Applicant: 3M INNOVATIVE PROPERTIES COMPANY, St. Paul, MN (US)

(72) Inventors: Myhanh T. Truong, Cottage Grove, MN (US); Ibrahim S. Gunes, Minneapolis, MN (US); Irem Bolukbasi, St. Paul, MN (US); Tony R. Carrozzella, Ontario (CA); Markus A. Wicki, Ontario (CA)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 47 days.

(21) Appl. No.: 16/344,203

(22) PCT Filed: Oct. 11, 2017

(86) PCT No.: PCT/US2017/056033
§ 371 (c)(1),
(2) Date: Apr. 23, 2019

(87) PCT Pub. No.: WO2018/080788
PCT Pub. Date: May 3, 2018

(65) Prior Publication Data
US 2019/0254496 A1    Aug. 22, 2019

Related U.S. Application Data

(60) Provisional application No. 62/412,930, filed on Oct. 26, 2016.

(51) Int. Cl.
| | |
|---|---|
| *A47L 13/17* | (2006.01) |
| *A01N 25/10* | (2006.01) |
| *A01N 25/16* | (2006.01) |
| *A01N 43/78* | (2006.01) |
| *A01N 55/00* | (2006.01) |
| *A01N 47/00* | (2006.01) |

(52) U.S. Cl.
CPC .............. *A47L 13/17* (2013.01); *A01N 25/10* (2013.01); *A01N 25/16* (2013.01); *A01N 43/78* (2013.01); *A01N 47/00* (2013.01); *A01N 55/00* (2013.01)

(58) Field of Classification Search
CPC ......... A47L 13/17; A01N 25/10; A01N 25/16; A01N 43/78; A01N 55/00; A01N 47/00
See application file for complete search history.

(56) References Cited

U.S. PATENT DOCUMENTS

| | | | |
|---|---|---|---|
| 4,045,238 A | 8/1977 | Battista | |
| 4,638,017 A | 1/1987 | Larson | |
| 2009/0163598 A1 | 6/2009 | Truong | |
| 2009/0264549 A1 | 10/2009 | Brown | |
| 2018/0303090 A1* | 10/2018 | Budhian | ................ A61K 31/19 |

FOREIGN PATENT DOCUMENTS

| | | |
|---|---|---|
| EP | 1600096 | 11/2005 |
| WO | WO 2016-044073 | 3/2016 |
| WO | WO 2016-044512 | 3/2016 |

OTHER PUBLICATIONS

Hunter, Foundations of Colloid Science, vol. 1, Oxford University Press, New York, 1987, 5 pages.
International Search Report for PCT International Application No. PCT/US2017/056033, dated Feb. 13, 2018, 7 pages.

* cited by examiner

*Primary Examiner* — Michael C Miggins
(74) *Attorney, Agent, or Firm* — 3M Innovative Properties Compa

(57) ABSTRACT

The inventors of the present disclosure recognized that, surprisingly, the antimicrobial treatments used on cellulosic sponges do not work in hydrophilic polyurethane sponges. As such, the inventors of the present disclosure discovered a need for an antimicrobial treatment for use on hydrophilic polyurethane foam sponges. The present inventors invented one antimicrobial composition for use on hydrophilic polyurethane foam sponges including an acetate salt solution humectant. The present inventors invented another antimicrobial composition for use on hydrophilic polyurethane foam sponges including a non-halogen humectant comprising a salt solution having a pH between about 3 and 10 and a water activity of less than 0.9 at 25° C.

17 Claims, No Drawings

ANTIMICROBIAL HYDROPHILIC POLYURETHANE FOAM SPONGES

TECHNICAL FIELD

The present disclosure generally relates to hydrophilic polyurethane sponges and processes of making them. The sponges are, for example, useful in home and industrial cleaning applications.

BACKGROUND

Sponges are a common cleaning article. Sponges are light, connective structures that have absorbent qualities. Sponges are in wide use for many cleaning applications. Many types of sponges exist. The most commonly used sponge is a cellulosic sponge. In addition to the prevalent cellulosic sponges, polyurethane or polyurea sponges exist. For example, U.S. Pat. No. 4,638,017 describes an exemplary hydrophilic polyeurethane/polyurea sponge. Also, PCT Patent Publication No. WO 2016/044512 describes a hydrophilic polyurethane foam prepared using a polyol mixture of non-sulfonated polyols and sulfonated polyols. Also, PCT Patent Publication No. WO 2016/044073 describes hydrophilic polyurethane sponges including particulate fillers (such as, for example, starch based nanoparticles) that cause the sponge to have a higher rate of water absorption.

In the absence of substantial water content (i.e. in their dry state), some sponges tend to shrink and became excessively stiff. In the presence of substantial water content (i.e., in their damp state), sponges are lofty and soft. Consumers overwhelmingly prefer to purchase lofty and soft sponges instead of shrunken and stiff sponges. As a result of this consumer preference, those sponges that shrink without substantial water content are often packaged for sale to consumers in a slightly moist condition to keep them lofty and soft. However, this moist environment can result in undesirable bacterial, fungus, and/or mold growth on the sponge and/or sponge packaging. Various methods exist to preserve products and promote package stability, including the use of antimicrobial agents, preservatives, and sterilization techniques.

SUMMARY

The inventors of the present disclosure recognized that, surprisingly, the antimicrobial treatments used on cellulosic sponges do not work in hydrophilic polyurethane sponges. As such, the inventors of the present disclosure discovered a need to develop an antimicrobial treatment that would work well on hydrophilic polyurethane sponges.

The inventors of the present disclosure discovered that incorporating an antimicrobial composition including an acetate salt solution humectant within the hydrophilic polyurethane foam sponges partially or completely kills microorganisms such as, but not limited to, bacteria, fungi, molds, mildew, and/or viruses within the hydrophilic polyurethane foam sponges.

The present inventors also discovered that incorporating an antimicrobial composition for use on hydrophilic polyurethane foam sponges including a non-halogen humectant comprising a salt solution having a pH between about 3 and 10 and a water activity of less than 0.9 at 25° C. partially or completely kills microorganisms such as, but not limited to, bacteria, fungi, molds, mildew, and/or viruses within the hydrophilic polyurethane foam sponges.

Some embodiments of the present disclosure relate to a hydrophilic polyurethane foam sponge, comprising: an antimicrobial composition including an acetate salt solution humectant. Some embodiments of the present disclosure relate to a hydrophilic polyurethane foam sponge, comprising: an antimicrobial composition including a non-halogen containing humectant comprising a salt solution having a pH between about 3 and 10 and a water activity of less than 0.9 at 25° C.

Some embodiments of the present disclosure relate to a method of making a sponge, comprising: providing a hydrophilic polyurethane foam sponge; absorbing into the hydrophilic polyurethane foam sponge an input solution comprising an acetate salt solution humectant; and packaging the sponge in a sealed package. In some embodiments, the method further involves bonding the acetate salt solution humectant within the sponge.

In some embodiments, the hydrophilic polyurethane foam sponge has a wet wipe water holding capacity of between about 0.2 g/g foam and about 10 g/g foam. In some embodiments, the hydrophilic polyurethane foam sponge has a pH of between about 3 and about 10. In some embodiments, the antimicrobial composition and/or the sponge passes ASTM G21. In some embodiments, the hydrophilic polyurethane foam sponge and/or the antimicrobial composition passes the aging test described herein. In some embodiments, the antimicrobial composition further includes a biocide, fungicide, preservative, biocide, anti-fungal agent, pesticide, and/or combinations thereof. In some embodiments, the hydrophilic polyurethane foam sponge and/or the antimicrobial composition has a water activity of less than 0.9 at 25° C. In some embodiments, the hydrophilic polyurethane foam sponge further includes one or more sulfonate groups. In some embodiments, the hydrophilic polyurethane foam sponge of any of the preceding claims, wherein the sponge is packaged in a sealed container including moisture.

DETAILED DESCRIPTION

Various embodiments and implementations will be described in detail. These embodiments should not be construed as limiting the scope of the present application in any manner, and changes and modifications may be made without departing from the spirit and scope of the inventions. Further, only some end uses have been discussed herein, but end uses not specifically described herein are included within the scope of the present application. As such, the scope of the present application should be determined by the claims.

As used herein, the term "foam" refers to a colloidal dispersion made of two distinct phases formed by two dissimilar materials. Thus, a foam may also be referred to as a solidified colloidal dispersion. For polyurethane (PU) foams, for example, a gas (most commonly carbon dioxide gas formed during foaming reactions) is dispersed within the PU liquid to form a distinct dispersed phase. This dispersion is subsequently solidified to obtain solid PU foam. As used herein, the term "sponge" is used to describe a solidified colloidal dispersion. Definitions of sponge and foam materials as used herein may be consistent with those defined in, "Foundations of Colloid Science", Vol. 1, Robert J. Hunter, Oxford University Press, New York, 1987, incorporated by reference herein its entirety."

The hydrophilic polyurethane foam sponges described herein can be made in any known way. Some exemplary such hydrophilic polyurethane foam sponges include, for example, those described in U.S. Pat. No. 4,638,017, PCT Patent Publication No. WO 2016/044512, and PCT Patent Publication No. WO 2016/044073, the entirety of each of which is incorporated herein. Hydrophilic polyurethane foam sponges are highly hydrophilic, often having a water-holding capacity 10 times their own weight. They also demonstrates excellent wet strength and are capable of both donating fluid and absorbing liquid. Hydrophilic polyurethane foam sponges may contain additional materials such as dyes, perfumes, fragrances, surfactants, and reinforcing fibers. Reinforcing fibers may be natural fibers, tissue dust, open shredded pulp fiber, cotton fibers. Natural fibers include cotton, wool, silk, hemp, bamboo, viscose fibers such as rayon.

The excellent water adsorption qualities of hydrophilic polyurethane foam sponges can create drawbacks. The moisture adsorbed into the hydrophilic polyurethane foam sponges can contain unwanted microorganisms. Once adsorbed into the hydrophilic polyurethane foam sponges, the microorganisms may remain, thrive, and multiply in the moist environment found within the packaged sponge. The microorganisms may look unappealing to potential consumers. At worst, the microorganisms could raise health and safety concerns. For example, during cleaning, various microorganisms within the hydrophilic polyurethane foam sponges may be transferred to other surfaces that the users believe they are cleaning, when in fact they are spreading microorganisms over other surfaces.

The inventors of the present disclosure discovered that incorporating an antimicrobial composition including an acetate salt solution humectant within the hydrophilic polyurethane foam sponges partially or completely kills microorganisms such as, but not limited to, bacteria, fungi, molds, mildew, and/or viruses within the hydrophilic polyurethane foam sponges. Exemplary acetate salts include, for example, potassium acetate salt, aluminum acetate salt, and ammonium acetate salt.

The present inventors also discovered that incorporating an antimicrobial composition for use on hydrophilic polyurethane foam sponges including a non-halogen humectant comprising a salt solution having a pH between about 3 and 10 and a water activity of less than 0.9 at 25° C. partially or completely kills microorganisms such as, but not limited to, bacteria, fungi, molds, mildew, and/or viruses within the hydrophilic polyurethane foam sponges. In some embodiments, the pH is between about 4 and about 8. In some embodiments, the water activity is less than 0.8 at 25° C. In some embodiments, the water activity is less than 0.7 at 25° C. In some embodiments, the water activity is less than 0.6 at 25° C.

Most antimicrobial treatments used on sponges include a humectant. Humectants serve multiple purposes. First, humectants are used to keep a sponge moist by preventing excessive evaporation of water from the sponge. In the absence of a humectant, significant amounts of water would evaporate from the sponge within the package and this water vapor may subsequently re-condense on the inner surfaces of the packaging film and/or may diffuse out of the packaging film. A re-condensation event may result in accumulation of liquid water within package which will negatively impact the appearance of the product and perhaps more importantly, may promote mold growth on the inner surfaces of the packing film and/or on the sponge. A diffusion event will eventually reduce the amount of total water in the package which, in turn, may promote shrinkage and loss of loftiness, softness, and the dimensional stability of the sponge.

Another role that is played by the humectant is reducing the water activity which, in turn, may prevent and reduce the probability of a mold growth. In a general sense, water activity may be envisioned as the ratio of 'free water content' to the 'total water content' in a system. The scientific literature established that most organisms require certain amount of 'free' water to survive. It also appears that most organisms cannot metabolize the 'bound' water. So, instead of the total water content of a system, the extent of 'free' water in the system usually dictates whether an organism can survive in that environment or not. Many microorganisms, such as bacteria, prefer a water activity level of 0.99 and most need higher than 0.91 to grow.

In some embodiments, additional antimicrobial and/or antifungal agents may be incorporated into the sponge. Optional antimicrobial agents include cationic amine antimicrobial compounds, which include antimicrobial protonated tertiary amines and small molecule quaternary ammonium compounds. Quaternary ammonium compounds are generally considered "broad spectrum" antimicrobial cationic compounds having efficacy against both gram positive (e.g., *Staphylococcus* sp.) and gram negative (e.g., *Escherichia coli*) microorganisms. Thus, the quaternary ammonium compounds can be incorporated for antibacterial purposes for the sponge, while in the package, and should be present in amounts effective for such purposes. The choice of the quaternary ammonium compounds is not critical. Typically they are preferably selected from mono-long-chain, tri-short-chain, tetralkyl-ammonium compounds, di-long-chain, di-short-chain tetralkyl-ammonium compounds, and mixtures thereof. The chains may straight or branched. N-heterocyclic ring compounds are also considered quaternary ammonia compounds. Exemplary small molecule quaternary ammonium compounds include benzalkonium chloride and alkyl substituted derivatives thereof, di-long chain alkyl (C8-C18) quaternary ammonium compounds, cetylpyridinium halides and their derivatives, benzethonium chloride and its alkyl substituted derivatives, octenidine and compatible combinations thereof.

There are a variety of ways to introduce the humectant into the cellulose sponge. One way may be to include the humectant in the input solution absorbed into the sponge prior to packaging. Following absorption of the input solution into the sponge, the sponge is squeezed of excess liquid. Then, the sponge may be converted to the appropriate size and packaged in a sealed plastic film.

Although specific embodiments of this disclosure have been shown and described herein, it is understood that these embodiments are merely illustrative of the many possible specific arrangements that can be devised in application of the principles of the disclosure. Numerous and varied other arrangements can be devised in accordance with these principles by those of ordinary skill in the art without departing from the spirit and scope of the disclosure. Thus, the scope of the present disclosure should not be limited to the structures described in this application, but only by the structures described by the language of the claims and the equivalents of those structures.

In some embodiments, the hydrophilicity of foam sponges and/or articles including the foam sponges can exhibit a desirable wet wipe water holding capacity. By way of example, in some embodiments, the foam sponges can exhibit a wet wipe water holding capacity of greater than about 0.2 g/g foam, or greater than about 1.0 g/g foam, or greater than about 2.0 g/g foam, or greater than about 2.5 g/g foam, or greater than about 3.0 g/g foam, or greater than about 3.5 g/g foam. Wet wipe water holding capacity can be indicative of how a foam takes up and reversibly holds onto water. A relatively high wet wipe water holding capacity can be useful in various applications including, but not limited to, cleaning applications. The following procedure can be used to determine wet wipe water holding capacity: (1) 25 grams of tap water is slowly poured onto a polished stainless steel plate; (2) a rigid plastic container is filled with tap water and a dry foam sponge sample is completely submerged into the container; then, the foam sample is taken out of the water and squeezed by hand pressure to remove as much soaked water as possible; then, the squeezed foam sample is immersed once again in the tap water. This immersion/squeezing/re-immersion cycle is repeated five times. (3) After completing five cycles, the foam sample is taken out of water and squeezed by hand pressure to remove as much soaked water as possible. Then, the hand-squeezed foam sample is wrung out with a manual nip roller operated under hand pressure. The nipping action repeated multiple times, until no more water is seen removed. Then, the weight of the wrung foam sample is determined. This weight value is designated as 'wrung weight'. (4) The wrung foam sample is slowly passed across the water poured on the polished stainless steel plate while the front end of the foam is slightly lifted to facilitate wiping action. (5) After the foam sample is passed across water, the weight of the foam sample which absorbed water is determined. This weight value is designated as the "first pass" weight. (6) The wet wipe water holding capacity is calculated by dividing the difference between the 'first pass' and 'wrung weight' by 'wrung weight'.

EXAMPLES

Materials

The following materials were used in the preparation of the Examples and Comparative Examples.

TABLE 1

Materials.

| Material | Description |
|---|---|
| Foam | Sulfonated polyurethane foam as per "Preparatory Example 4" of PCT Patent Publication No. WO2016044512. |
| Preservative | A preservative which contains a mixture of two isothiazolinones identified by the IUPAC system of nomenclature as 5-chloro-2-methyl-4-isothiazolin-3-one (1.15%) and 2-methyl-4-isothiazolin-3-one (0.35%), commercially available from Dow Chemical Company, Midland, MI, under the trade designation of KATHON CG/ICP. |
| Antimicrobial | 3.6 wt % 1-Octadecanaminium, N,N-dimethyl-N-[3-(trihydroxysilyl)propyl]-chloride solution, commercially available from ÆGIS Environments, Huntersville, NC, under the trade designation of AEM 5772-5 Antimicrobial. |
| Biocide | A biocide with a density of approximately 1.05 g/cc and in the form of an opaque liquid, commercially available from LANXESS Corporation, Pittsburgh, PA, under the trade designation of METASOL TK-25 AD (25% active ingredient). |
| Salt-1 | Magnesium Chloride, 6-Hydrate, Crystal powder, with a molecular weight of 203.3 g/mol, commercially available from Avantor Performance Materials, Inc., Center Valley, PA, under the product number of 2444-01. |
| Salt-2 | Potassium acetate powder with a molecular weight of 98.15 g/mol, commercially available from Alfa Aesar Thermo Fisher Scientific Chemicals, Inc., Tewksbury, MA, under the stock number of 13449. |
| Acid-1 | GR ACS Acetic Acid, Glacial, with a molecular weight of 60.05 g/mol, commercially available from EMD Millipore Corp., Billerica, MA, under the catalog number of AX0073P-5. |
| Acid-2 | Anhydrous fine-granular citric acid powder, with a molecular weight of 192.12 g/mol, commercially available from EMD Millipore Corp., Billerica, MA, under the catalog number of 1002475000. |
| Alcohol | GR ACS Glycerol, with a molecular weight of 92.09 g/mol, commercially available from EMD Millipore Corp., Billerica, MA, under the catalog number of GX0185-6. |
| Glycol | Propylene glycol, with a molecular weight of 76.09 g/mol, commercially available from Sigma-Aldrich Co. LLC, St. Louis, MO, under the catalog number W294004. |

Test Methods

Anti-Fungal Test

Anti-fungal tests were performed on the wet foam specimens according to ASTM G21-15: Standard Practice for Determining Resistance of Synthetic Polymeric Materials to Fungi for four weeks. Three specimens were tested for each sample, although no substantial variation was observed from specimen to specimen from the same sample batch.

The results of the tests are reported in Table 2. Samples which had a rating of 1 and 2 at the end of 4 weeks according to the ASTM G21 method were designated as 'passed'. Samples which had a rating of 3 and 4 at the end of 4 weeks were designated as 'failed'.

Aging Test

The treated foam samples which passed the anti-fungal test were placed in zip-lock bags and left in an oven (Despatch Industries, Minneapolis, M, USA, Model No: LFD2-24-3) for 14 days. The set temperature of the oven was 49° C. After 14 days, the samples were removed from the oven and visually observed for any color change. The samples which showed any visible discoloration was designated as 'failed'. Otherwise, they were designated as 'passed'. If the sample failed the anti-fungal test, no aging test was performed.

Examples 1 and 2 and Comparative Examples CE1-CE5

Preparation of Treatment Solutions:

The majority of the treatment solutions were prepared as follows. A laboratory glass beaker was placed onto a balance and desired amounts of deionized water at 25° C. was added to beaker. Then the ingredients were added sequentially and slowly into deionized water in the beaker. The pH level of the as-prepared solutions was determined with the pH meter (Orion 3-star benchtop pH meter, Thermo Fisher Scientific Inc., Minneapolis, Minn.) and reported in Table 2. The prepared treatment solutions were kept on a laboratory bench at 25° C. for 24 hours before treating the foam samples with them. The composition of the ingredients for each treatment solution was calculated and reported in Table 2.

The remaining treatment solutions were prepared as follows: In the first step, a laboratory glass beaker was placed onto a laboratory bench and desired amounts of deionized water at 25° C. was added to beaker. Then, the ingredients were added sequentially and slowly into deionized water in the beaker. After the last ingredient was added, the mixture in the laboratory beaker was placed on a Benchtop Reciprocal Shaker (Model E5850, Eberbach Corp., Ann Arbor, Mich.) and mixed for 2 minutes at a speed of 100 oscillations per minute, to obtain the first mixture. Then shaker was stopped and the pH of the first mixture was measured by the pH meter. If the pH was at the desired level, the treatment solution was used in the experiments without any further modification. If the pH level was higher or lower than desired level, the second preparation step was executed. In the second step, desired amounts of acid was added to the first mixture to obtain the second mixture. Then the second mixture was placed again on the shaker and mixed for another 2 minutes at a speed of 100 oscillations per minute. Then, the shaker was stopped and the pH of the second mixture was determined. If the pH was not at the desired level, the second step was repeated until the desired pH level was reached. The second step was considered as buffering. The final pH level of the second mixture was determined by the pH meter and reported as the pH of the treatment solution in Table 2. The prepared treatment solutions were kept on a laboratory bench at 25° C. for 24 hours before treating the foam samples with them. The composition of the ingredients for each treatment solution was calculated and reported in Table 2.

Treatment of Foam Specimens

Thin sections of the as prepared foam, with dimensions of 20 mm×20 mm×2 mm, were rinsed under running deionized water at 25° C. prior to performing any experiment. The samples were rinsed and squeezed by hand to remove any excess water from the foam specimen. Then, the rinsed specimen was kept on a laboratory bench at 25° C. to evaporate any excess water. The foam specimens left on the bench for 24 hours were observed to be substantially dry and were designated as dry specimens. The weight of the dry and wet specimens were determined with a balance. Then, the dry specimens were immersed in the previously prepared treatment solutions and kept in them for approximately 2 minutes. It was observed that the dry foam specimens rapidly absorbed the prepared treatment solutions. The excess treatment solution was eliminated from the foam sample by squeezing by hand. The foam specimens which were immersed in and absorbed the treatment solutions were designated as wet specimens. The ratio of the weight of the dry specimen to that of the wet specimen was kept between 0.50 and 0.55.

TABLE 2

Test Data and Composition Information re. Examples and Comparative Examples

| Example | Composition | pH of the treatment solution | ASTM G21 Test | Aging Test |
|---|---|---|---|---|
| Example 1 | 15 grams of Salt-2 + 0.099 grams of Preservative + 0.75 grams of Acid-1 + 134.151 grams of deionized water | 5.88 | Passed | Passed |
| Example 2 | 30 grams of Salt-2 + 4.8 grams of Biocide + 115.2 grams of deionized water | 8.12 | Passed | Passed |
| CE1 | 150 grams deionized water | 6.15 | Failed | NA |
| CE2 | 32.03 grams of Salt-1 + 117.98 grams of deionized water + buffered with Acid-2 to obtain a pH of 2.00 | 2.00 | Passed | Failed |
| CE-3 | 15 grams of Glycol + 135 grams of deionized water + required amount of Acid-2 as buffer to obtain a pH of 4.00. | 4.00 | Failed | NA |
| CE-4 | 15 grams of Glycol + 0.42 grams of Antimicrobial + 134.58 grams of deionized water | 4.00 | Failed | NA |
| CE-5 | 37.5 grams of Alcohol + 0.14 grams of Preservative + 0.6 grams Acid-2 + 111.76 grams of deionized water | 2.38 | Failed | NA |

Reference throughout this specification to "one embodiment," "some embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Further-more, the particular features, structures, materials, or characteristics may be combined in any suitable manner in one or more embodiments.

The recitation of all numerical ranges by endpoint is meant to include all numbers subsumed within the range (i.e., the range 1 to 10 includes, for example, 1, 1.5, 3.33, and 10). All references mentioned herein are hereby incorporated by reference in their entirety.

Those having skill in the art will appreciate that many changes may be made to the details of the above-described embodiments and implementations without departing from the underlying principles thereof. Further, various modifications and alterations of the present invention will become apparent to those skilled in the art without departing from the spirit and scope of the invention. The scope of the present application should, therefore, be determined only by the following claims and equivalents thereof.

What is claimed is:

1. A hydrophilic polyurethane foam sponge, comprising:
an antimicrobial composition including an acetate salt solution humectant.

2. The hydrophilic polyurethane foam sponge of claim 1, wherein the sponge has a wet wipe water holding capacity of between about 0.2 g/g foam and about 10 g/g foam.

3. The hydrophilic polyurethane foam sponge of claim 1, wherein the antimicrobial composition has a pH of between about 3 and about 10.

4. The hydrophilic polyurethane foam sponge of claim 1, wherein the antimicrobial composition passes ASTM G21.

5. The hydrophilic polyurethane foam sponge of claim 1, wherein the antimicrobial composition further includes a biocide, fungicide, preservative, biocide, anti-fungal agent, pesticide, and/or combinations thereof.

6. The hydrophilic polyurethane foam sponge of claim 1, wherein the antimicrobial composition has a water activity of less than 0.9 at 25° C.

7. The hydrophilic polyurethane foam sponge of claim 1, wherein the sponge further includes one or more sulfonate groups.

8. The hydrophilic polyurethane foam sponge of claim 1, wherein the sponge is packaged in a sealed container including moisture.

9. A hydrophilic polyurethane foam sponge, comprising:
an antimicrobial composition including a non-halogen containing humectant comprising a salt solution having a pH between about 3 and 10 and a water activity of less than 0.9 at 25° C., wherein the antimicrobial composition includes an acetate salt solution humectant.

10. The hydrophilic polyurethane foam sponge of claim 9, wherein the sponge has a wet wipe water holding capacity of between about 0.2 g/g foam and about 10 g/g foam.

11. The hydrophilic polyurethane foam sponge of claim 9, wherein the antimicrobial composition has a pH of between about 4 and about 8.

12. The hydrophilic polyurethane foam sponge of claim 9, wherein the antimicrobial composition passes ASTM G21.

13. The hydrophilic polyurethane foam sponge of claim 9, wherein the antimicrobial composition has a water activity of less than 0.8 at 25° C.

14. The hydrophilic polyurethane foam sponge of claim 9, wherein the sponge further includes one or more sulfonate groups.

15. The hydrophilic polyurethane foam sponge of claim 9, wherein the sponge is packaged in a sealed container including moisture.

16. A method of making a sponge, comprising:
providing a hydrophilic polyurethane foam sponge;
absorbing into the hydrophilic polyurethane foam sponge an input solution comprising an acetate salt solution humectant; and
packaging the sponge in a sealed package.

17. The method of claim 16, further comprising:
bonding the acetate salt solution humectant within the sponge.

* * * * *